E. C. WOOD, F. M. DURKEE, W. F. KELLEY & J. B. MILLET.
SUBMARINE SIGNALING APPARATUS.
APPLICATION FILED JAN. 23, 1905.
921,326.
Patented May 11, 1909.
3 SHEETS—SHEET 1.
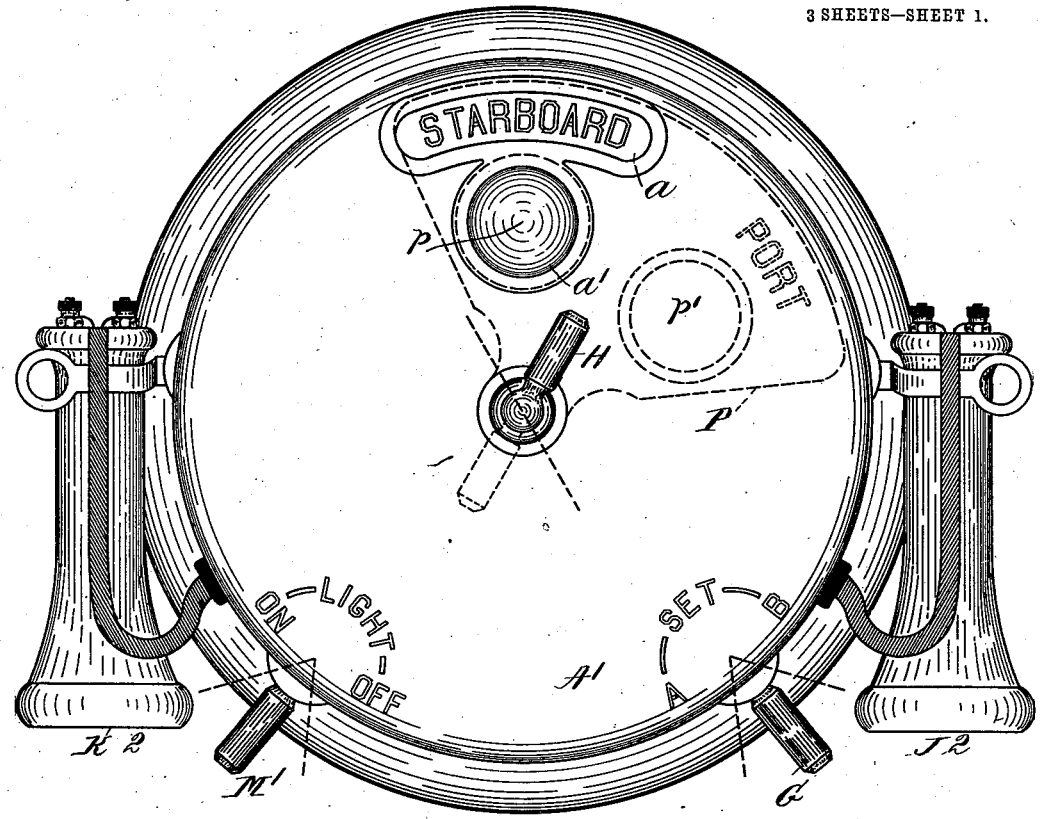
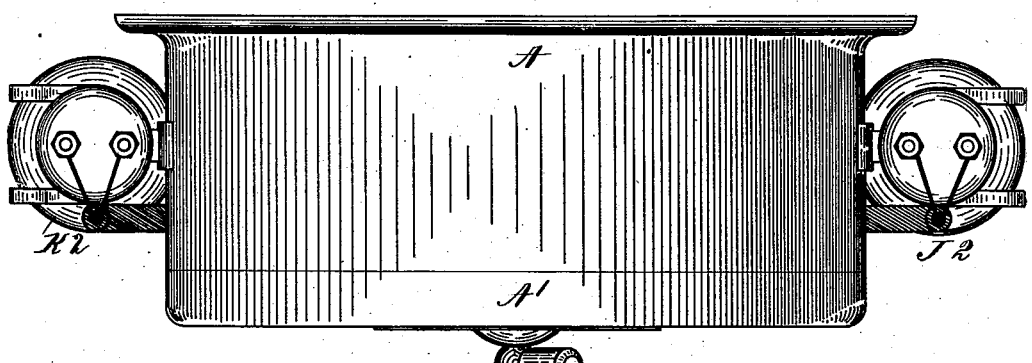

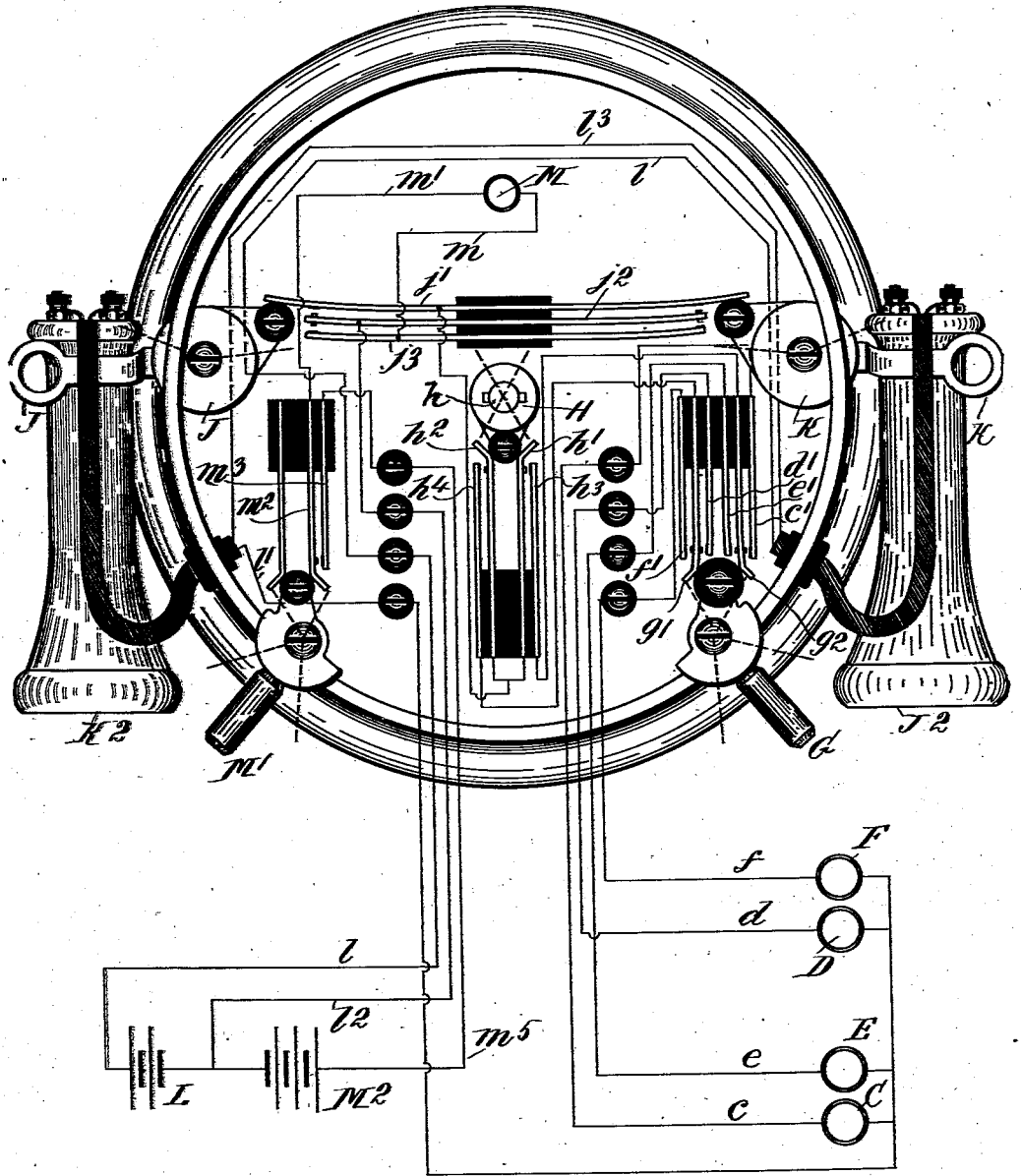

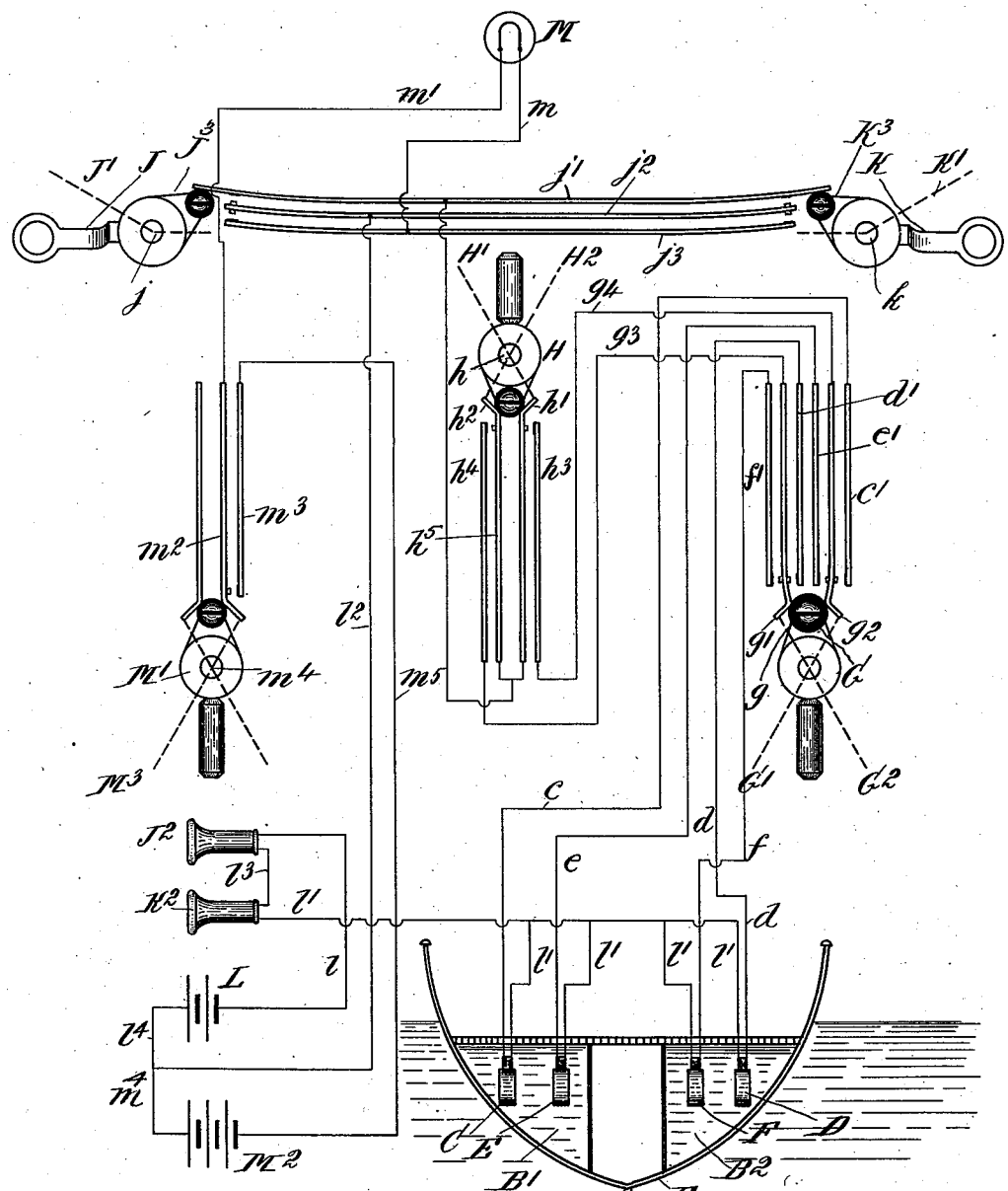

UNITED STATES PATENT OFFICE.

EDWARD C. WOOD, OF SOMERVILLE, FREDERICK M. DURKEE, OF NEWTON, AND WALTER F. KELLEY AND JOSIAH B. MILLET, OF BOSTON, MASSACHUSETTS, ASSIGNORS TO SUBMARINE SIGNAL COMPANY, OF WATERVILLE, MAINE, A CORPORATION OF MAINE.

SUBMARINE SIGNALING APPARATUS.

No. 921,326.     Specification of Letters Patent.     Patented May 11, 1909.

Application filed January 23, 1905. Serial No. 242,254.

*To all whom it may concern:*

Be it known that we, EDWARD C. WOOD, of Somerville, FREDERICK M. DURKEE, of Newton, both in the county of Middlesex, and WALTER F. KELLEY and JOSIAH B. MILLET, both of Boston, in the county of Suffolk, all in the State of Massachusetts, have invented a certain new and useful Improvement in Submarine Signaling Apparatus, and do hereby declare the following, when read in connection with the accompanying drawings, to be a full and exact description of our invention.

There is in practical use a system of submarine signaling which comprises signaling apparatus located under water, operated from a lightship, a buoy or a shore station, and a receiving apparatus located on shipboard, by means of which the signals are picked up and transmitted to some convenient place thereon such as the pilot house where they may be received by the ship's pilot or other officer.

The present invention relates to the electrical transmission on shipboard of such signals from a microphone transmitter to a single telephone receiving circuit by which means a most delicate comparison of such sound is possible. The means for picking up and transmitting the signals which we most have in mind as being especially useful in this connection are those described in Letters Patent of the United States No. 768,568 and No. 768,570, both dated August 23, 1904.

The main object of our invention is to provide means whereby signals so received may be conveniently and accurately used to determine the position of the ship receiving the signals. The general method of determining the position of the ship with relation to the point or points from which signals are being sent is set forth in Letters Patent of the United States, No. 787,854, to Arthur J. Mundy and Josiah B. Millet. For this purpose the invention as herein disclosed employs two microphone transmitters, one located on each side of the ship, each located in its own water tank, with means whereby either transmitter may be connected with the same receiving instrument or pair of instruments. By this means it may not only be determined which transmitter gives the stronger sound, but the sound from each transmitter being received upon the same telephone or pair of telephones, an accurate comparison may be made of the strength of the sound in the two transmitters, more accurate than would be possible if each transmitter were connected to its own telephone, in which case there would be differences in the telephones which would affect the comparison. By comparing the strength of the sound received from the transmitters on the two sides of the ship and at the same time manipulating the ship as hereinafter described, the bearing of the sound signal may be determined.

A detail of the invention herein described relates to the centralizing, coördinating, and systematizing of the various connections necessary for accomplishing the purpose above described in a single instrument where by ready and simple manipulation and coöperation of the various parts not only may the necessary connections be made, but an indication given, visible either in light or darkness, as to the side of the ship on which the signal is heard.

Broadly stated, the features of our invention are then, firstly, a single or unitary indicating mechanism, and secondly, a novel system of connections between said indicator and the receiving transmitters, whereby the indicator may be thrown at will into and out of communication with any particular transmitter.

Another feature of our invention is means whereby the indicator may have an unset or normally inoperative position, in which position the battery circuits are broken, and the indicator automatically disconnected from the transmitters.

A feature of our invention is a plurality of sets of transmitters, such for instance, as bow and stern sets, which are adapted to be alternated or substituted in the indicator circuit preliminary to or during the comparison of starboard or port effects.

Another feature of our invention is a means for visually indicating the position of the particular transmitters with which the operator's instrument is in circuit, and means for rendering such visual indicating means visible at night.

Having briefly set forth the general objects and nature of our invention, we shall now describe the same more particularly in connection with the accompanying drawings, in which—

Figure 1 is an elevation of the operator's indicator. Fig. 2 is a top plan view thereof. Fig. 3 is a view thereof in elevation, the front face of the cover of the indicating box being removed and the various circuits or mechanisms being shown more or less diagrammatically. Fig. 4 is a diagrammatic view of the entire apparatus for the purpose of showing the electric circuits.

Referring to Figs. 1 and 2, there is shown an exterior view of the indicator, which, when in use, is mounted on shipboard in a position convenient to the pilot or operator. This indicator comprises a box A, upon which are hung telephone receivers $J^2$ and $K^2$, one for either ear. The box is preferably of brass, but may be of any suitable material and is provided with a removable face or cover $A^1$. Projecting from the center of the box is shown a switch H, by means of which the receivers $J^2$ and $K^2$ are placed at will in communication with either the starboard or the port transmitters. In the face or cover of the box are two openings $a$ and $a^1$, and mounted integrally with the shaft $h$ of the switch H, behind the face of the cover $A^1$ is a semaphore P, various parts of which, according to the position of the switch H, are adapted to intersect the line of the openings $a$ and $a^1$. Within the opening $a^1$ is an electric lamp M, and projecting through a slot in the lower left hand part of the box A is a switch $M^1$ for opening and closing the circuit of said lamp. The shutter P at different angular positions thereon bears the symbols "Starboard" and "Port." In the position shown in the drawings the symbol "Starboard" registers with the opening $a$ and is visible, whereas the symbol "Port" being behind the face $A^1$ of the box, is not visible. In this position, as visually indicated, the starboard transmitters are in circuit with the telephone receivers. The shutter P carries also at different angular positions, two disks $p$ and $p^1$ of colored glass, the disk $p$ being colored green and the disk $p^1$ being colored red. When the symbol "Starboard" of the shutter registers with the opening $a$ the green disk $p$ registers with the opening $a^1$ across the face of the lamp M. When the lamp circuit is closed as at night, the green light will indicate "starboard." The position of the switch H, however, being changed to throw in the "port" transmitters, the red disk $p^1$ will register with the lamp and the opening $a^1$, and thus give at night a visual indication of this position of the switch H. Projecting through a slot in the lower right hand corner of the indicator box, is shown a switch G. This switch determines the particular set of transmitters to be in the circuit of the telephones. The transmitter sets controlled by this switch may be sets to be substituted for each other in case of emergency, or may be differently located sets, as for instance, stern and bow sets, to be used according to the general direction of the signal being received.

Referring now to Figs. 3 and 4, and for a general illustration of the circuit connections, more particularly to Fig. 4, there is here diagrammatically indicated at B the vessel upon which the entire apparatus is mounted. On either side of the keel are shown tanks $B^1$ and $B^2$ in which are mounted sets of transmitters. The water tanks and the particular manner of mounting the transmitters therein is disclosed in Patent No. 768,570, and forms no part of this invention. At $J^2$ and $K^2$, Fig. 4, we have shown the telephone receivers of the operator's indicator and at J and K we have shown the switch hooks upon which the receivers normally hang. The switches controlled by the switch hooks are such that when the telephones hang in their place every circuit of the indicating mechanism is broken so that the indicator is normally disconnected from each transmitter and no waste of battery occurs. The switch G is shown controlling the connections of the various transmitter sets to determine the particular set in use as above stated. The switch H is shown controlling the particular transmitters, whether starboard or port, of the set selected by means of the switch G; and the telephone hook switches $J^3$ and $K^3$ as controlling the circuit of the particular transmitter selected by the switches H and G. The switch $M^1$ is shown to the left, and as heretofore mentioned, controls the circuit of the lamp M. To describe the various circuits more in detail—the telephones $J^2$ and $K^2$ are shown connected in series with each other by the line $l^3$, and with the telephone battery L by the line $l$. From the telephones the circuit leads by line $l^1$ to the transmitters C, D, E, and F, which transmitters are connected by multiple branch circuits $c$, $d$, $e$, and $f$, to the terminals $c^1$, $d^1$, $e^1$, and $f^1$, respectively, of the "set" switch G. In addition to the switch terminals just mentioned, the switch G is provided with spring terminals $q^1$ and $q^2$, which, when the switch G is in its normally neutral position, bear against the insulating roller $q$ thereof, and are out of contact with any other terminal of the switch. When however, the switch G is thrown to the left, and into the dotted position indicated at $G^2$, the terminal $q^1$ is forced into contact with the terminal $f^1$ and the terminal $q^2$ by virtue of its resiliency snaps into position against the terminal $e^1$. In this position the lines $f$ and $e$ of transmitters F and E are thrown into circuit with the switch contacts $g^2$ and $g^1$. The contacts $g^2$ and $g^1$ are connected by lines $g^4$ and $g^3$ with the contacts $h^3$ and $h^4$ of the "direction" switch H. Thus when the switch G is in the position indicated at $G^2$ the transmitters E, F are in connection with the switch H; the starboard transmitter F of this set in circuit with the contact $h^4$, and the port transmitter E being in circuit with the contact $h^3$. When however, the switch G is in dotted position indicated by $G^1$, the lines $c$ and $d$ of the transmitters C and D are in circuit with the spring contacts $g^2$ and $g^1$, and thence, through the lines $g^4$ and $g^3$ are in circuit with the contact strips $h^3$ and $h^4$ of the switch H. In this instance, as before, the starboard transmitter of the set in use is in circuit with the contact $h^4$, and the port transmitter of that set with the contact $h^3$.

In addition to the contacts $h^3$ and $h^4$ the switch H is provided with spring contacts $h^1$ and $h^2$. So long as the switch H is in its central or normally inoperative position the contacts $h^1$ and $h^2$ bear against the insulating roller of the switch and are out of contact with the contacts $h^3$ and $h^4$. When however, the switch H is thrown into the dotted position $H^2$, as for instance indicated in Fig. 1, the starboard circuit $g^3$ to the contact $h^4$ is closed, through the contact $h^2$ with the line $h^5$, and through the line $h^5$ to the spring contact $j^1$ of the telephone hook switch. Should the switch H be thrown into the dotted position $H^1$, the spring $h^2$ will spring out of contact with the contact $h^4$ and the spring $h^1$ be forced into contact with the strip $h^3$, thereby closing the circuit of the port line $g^4$ through the line $h^5$ to the contact strip $j^1$ of the telephone switch. Thus by throwing the switch H either to the right or left, the starboard or port transmitter, as the case may be, is put in contact with the telephone switch.

As heretofore stated, the hook switch is shown so constructed that the battery and telephone circuit therethrough is normally broken. The structure of this switch comprises three normally insulated contact strips, a central strip $j^2$ and two parallel strips $j^1$ and $j^3$, all resilient in character. The spring contact $j^1$ is slightly longer at either end than the contacts $j^2$ and $j^3$, so as to engage the insulated roller of the telephone switch hook and be controlled thereby. The central contact strip $j^2$ is connected by lines $l^2$ and $l^4$ to the telephone battery L. Either receiver being removed from its hook J or K the spring $j^1$ is released to its natural spring action and snaps downward, contacting with the strip $j^2$ and closing the circuit of the transmitter through the line $l^2$ of the battery telephones; whereupon, by placing the telephones to the ears the signal may be received.

The circuit of the lamp M heretofore mentioned is as follows. From the lamp (see Fig. 3) the line $m^1$ extends to the spring contact $m^2$ of the lamp switch $M^1$. In addition to the contact $m^2$ the switch $M^1$ has a contact $m^3$ which when the switch is in its normal or central position, is out of contact with the spring strip $m^2$. From the switch contact $m^3$ the line $m^5$ leads to the lamp battery $M^2$, and from the battery $M^2$ the lamp circuit is continued through the lines $m^4$ and $l^2$ to the central strip $j^2$ of the telephone hook switch. The other terminal of the lamp M is connected through line $m$ to the contact strip $j^3$ of the telephone hook switch. Upon removing either telephone receiver as heretofore mentioned, the action of the spring contact strip $j^1$ is not only to cause it to contact with the strip $j^2$, but its resiliency is such that it forces the strip $j^2$ to contact with the strip $j^3$, thereby closing the lamp circuit through the strips $j^2$ and $j^3$, as well as closing the telephone circuit through the strips $j^1$ and $j^2$ as heretofore described.

In operation the operator upon preparing to receive a signal first selects a set of transmitters to be used, and in doing so throws the switch G to the position $G^1$ or $G^2$, according to which transmitter set is selected. Having thus selected the set to be employed he prepares to take a starboard or port reading by throwing the switch H to the position $H^2$ or $H^1$, as the case may be. Should the reading be made at night, for the purpose of certainty in making his reading he closes the switch $M^1$ setting the lamp circuit. Having thus "set" both lamp and telephone circuits, he closes these circuits and makes his reading by removing one or both of the receivers and listening. Subsequent readings are made by throwing the switches H and G as herein indicated, and altering the position of the vessel until the direction of the incoming signal has been accurately determined as described in the above-named Letters Patent No. 787,854. At such a moment the sounds in the port or starboard transmitters will be equal in intensity and the vessel will be pointed toward the signaling station.

Having set forth the construction and method of using our invention, what we claim and desire to secure by Letters Patent is:—

1. Submarine signal receiving apparatus comprising an indicating means, a plurality of receiving transmitters each independent of the others, connections normally open and capable of connecting each of said transmitters with said indicating means, and means for selectively setting the connection between said indicating means and either of the transmitters to the exclusion of the others and means for closing the connections so set to receive the signals from said transmitter as described.

2. Submarine signaling apparatus comprising indicating means, a set of transmitters, connections whereby either transmitter of said set may be placed in exclusive connection with said indicating means, selective means for setting the connection from the indicating means to a signal transmitter, and means for closing the connection so set to receive the signals from said transmitter, substantially as set forth.

3. Submarine signal receiving apparatus comprising indicating means and a plurality of sets of transmitters, connections whereby any transmitter of any set may be placed in exclusive connection with said indicator, selective means for setting the connection from the indicator to a single transmitter set, and other selective means for setting the connection from the indicator to a single transmitter of the selected set, means for closing the connection so set to receive the signals, substantially as described.

4. Submarine signal receiving apparatus comprising an indicating means, a plurality of sets of transmitters, connections, whereby corresponding transmitters of such sets may be placed into communication with said indicator to the exclusion of other of said transmitters, selective means for setting the connections of such corresponding transmitters and means for closing said selected connections to the indicator to receive a signal, substantially as described.

5. Submarine signal receiving apparatus comprising an indicating means having in circuit therewith several sets of transmitters in multiple and means capable of connecting one set only of said transmitters at a time with said indicating means and means for connecting one transmitter of said connected set with said indicating means, as set forth.

6. Submarine signal apparatus comprising an indicating means having in circuit therewith a plurality of sets of transmitters, each set consisting of a plurality of variously disposed transmitters, the sets being in shunt relation to each other, and the transmitters of each set being in shunt relation to each other in the circuit of the indicator, and means for making and breaking at will the circuit of any one transmitter.

7. Submarine signal receiving apparatus comprising an indicating means having in circuit therewith a plurality of sets of transmitters, each set consisting of a plurality of variously disposed transmitters, all in shunt relation to each other, a switch having contacts equal in number to all the transmitters, to each of which contacts a transmitter is connected, said switch having also other contacts equal in number to the number of transmitters in each set, a second switch having contacts with each of which one of the last named contacts of the first switch is in circuit, said second switch having also another contact, a line from said last named contact of the second switch to the indicator, thence to a battery and thence in return to the transmitters.

8. In a submarine signal receiving apparatus, an electrical indicator, a plurality of variously disposed transmitters, connections adapted to connect each transmitter to said indicator without connecting any two transmitters simultaneously, said indicator having a receiving means connectible to each of such connections, and means for connecting said receiving means to one only of said connections at a time, and a light circuit separate from said transmitter connections and comprising a switch operable by the act of connecting said receiving means to said indicator adapted for the purposes set forth.

9. In a submarine signal receiving apparatus, an electrical indicator, a plurality of variously disposed transmitters, connections adapted to connect each transmitter to said indicator without connecting any two transmitters simultaneously, said indicator having a telephone connectible to one only of said transmitter connections at a time, a light connection and means for simultaneously making and breaking said telephone and light connections to give audible and visual indications when desired.

10. In a submarine signal receiving apparatus, an electrical indicator, a plurality of variously disposed transmitters, connections adapted to connect each transmitter to said indicator without so connecting any two transmitters simultaneously, said indicator having a receiving means common to all such connections, means for connecting said receiving means to one only of said connections at a time and a visual indicator connected to and operated by said connecting means.

11. In a submarine signal receiving apparatus, an electrical indicator, a plurality of variously disposed transmitters, connections adapted to connect each transmitter to said indicator without so connecting any two transmitters simultaneously, said indicator having a receiving means connectible to all such connections, means for connecting said receiving means to one only of said transmitter connections at a time, a visual indicator, and a separate light circuit for rendering said indicator visible operable by the operation of said transmitter connecting means.

12. In a submarine signal receiving apparatus, an electrical indicator, a plurality of variously disposed transmitters, connections adapted to connect each transmitter to said indicator without so connecting any two transmitters simultaneously, said indicator having a receiving means connectible to all such connections, means for connecting said receiving means to one only of said connections at a time, a visual indicator, a separate light circuit for rendering said indicator visible, and means for making and breaking said light circuit operable by the operation of said receiver connecting means.

13. In a submarine signal receiving apparatus, an electrical indicator, a plurality of variously disposed transmitters, connections adapted to connect each transmitter to said indicator without so connecting any two transmitters simultaneously, said indicator having a telephone connectible to all such connections, means for connecting said telephone to one only of said connections at a time, a visual indicator, a light circuit for rendering said indicator visible, and means for making and breaking said light circuit operable by the operation of said telephone connecting means.

14. In a submarine signal receiving apparatus, an electrical indicator, a plurality of variously disposed transmitters, connections adapted to connect each transmitter to said indicator without so connecting any two transmitters simultaneously, said indicator having a telephone connectible to all such connections, means for connecting said telephone to one only of said connections at a time, a visual indicator adapted to indicate the transmitter selected, a light circuit for illuminating said visual indicator, and means for simultaneously making and breaking said light and telephone circuits.

15. In a submarine signal receiving apparatus, an electrical indicator, a plurality of variously disposed transmitters, connections adapted to connect each transmitter to said indicator without so connecting any two transmitters simultaneously, said indicator having a telephone connectible to all such connections, means for connecting said telephone to one only of said connections at a time, a visual indicator, a light circuit for illuminating said visual indicator, and means for throwing in contact said visual indicator and simultaneously making and breaking said telephone and light circuits.

16. In a submarine signal receiving apparatus, an indicator, a plurality of variously disposed transmitters, connections adapted to connect each transmitter to said indicator without so connecting any two transmitters simultaneously, receivers, means for closing any one of said connections through said receivers to the exclusion of the others, means for automatically indicating by an illumination which one of a pair of transmitters is in circuit.

17. In a submarine signal receiving apparatus, an indicator, a plurality of variously disposed transmitters, means adapted to connect each transmitter to said indicator without so connecting any two transmitters simultaneously, means for closing any of said connections, receivers connectible with one transmitter only at a time and means for automatically displaying both a reading and an illuminated indication of which one of a pair of transmitters is in circuit.

18. In a submarine signal receiving apparatus, an indicator, variously disposed transmitters, connections adapted to connect each transmitter to said indicator without so connecting any two transmitters simultaneously, means for closing any of said connections and means actuated in the operation of said circuit closer to indicate the circuit closed, said means consisting of a movable semaphore bearing symbols and variously colored translucent disks adapted to indicate upon which side of the ship the connected transmitter is located and a lamp located to register with said disks according to the position of the shutter.

19. In a submarine signal receiving apparatus, an indicator, a telephone, connections to variously disposed transmitters, said transmitters, means for closing any of said connections through said telephone connectible with one transmitter only at a time, and a light disposed with relation to said connections as described whereby the closing of said connections will cause the light to indicate which one of a pair of transmitters is in circuit.

20. In a submarine signal receiving apparatus, an indicator, a telephone therein, a series of transmitters variously disposed, and means whereby said telephone may be connected to either of said transmitters to the exclusion of the others, and electrical means for visually indicating the transmitter connection, said means being located upon an open circuit closable by the act of removing the telephone for use, and means common to said connections for making and breaking the same.

21. In a submarine signal receiving apparatus, an indicator, a telephone therein, a series of transmitters variously disposed, and means whereby said telephone may be connected to either one of said transmitters to the exclusion of the others, and electrical means for visually indicating the transmitter connections, said means being located upon a normally open circuit, and a telephone hook switch for making and breaking all said circuits.

22. In a submarine signal receiving apparatus, an indicator, a telephone therein, connections from said telephone to variously disposed transmitters and electrical means for visually indicating the transmitter connections, said means being in parallel circuit with the telephone, and a switch for making and breaking all circuits, said switch having a contact in said telephone circuit, a contact in the circuit of the visual indicator and a contact common to both said circuits, and means for electrically connecting the three contacts.

23. In a submarine signal receiving apparatus, an indicator, a telephone therein, connections from said telephone to variously disposed transmitters and electrical means for visually indicating the transmitter connections, said means being in parallel circuit with the telephone, and a telephone hook switch for making and breaking said circuits, said switch having a contact in the telephone circuit, a contact in the circuit of the visual indicator and a contact common to both said circuits, the three contacts being electrically connected by the removal of the telephone from the hook.

24. In a submarine signal receiving apparatus, telephonic receiving means, two or more sets of transmitters variously disposed, means for connecting one of said sets with said telephonic receiving means, means for selecting a particular transmitter of said set, and means for visibly indicating which one of the transmitters of said connecting set has been so connected, all arranged as described, whereby all of said means are out of circuit except when said telephonic receiving means are in use, as described.

25. In a submarine signal receiving apparatus, a telephonic receiving means, one or more sets of transmitters, each set being independent of the others, the several transmitters of each set being located upon different parts of the ship, means whereby one of said sets of transmitters may be selected in preference to the others, means whereby one transmitter of said selected set may be selected in preference to the others, and means whereby said transmitter may be brought into connection with said telephonic receiving means, as described.

EDWARD C. WOOD.
FREDERICK M. DURKEE.
WALTER F. KELLEY.
JOSIAH B. MILLET.

In presence of—
 HORACE B. GALE,
 A. J. CONVERSE,
 JOHN E. R. HAYES.